(12) United States Patent
Lau et al.

(10) Patent No.: US 8,666,396 B2
(45) Date of Patent: Mar. 4, 2014

(54) PROVIDING USER LOCATION AND TIME ZONE INFORMATION FOR LTE/IMS CHARGING

(75) Inventors: Priscilla Lau, Fremont, CA (US);
Imtiyaz Shaikh, Irving, TX (US);
Mingxing Li, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 165 days.

(21) Appl. No.: 13/217,878

(22) Filed: Aug. 25, 2011

(65) Prior Publication Data
US 2013/0053027 A1 Feb. 28, 2013

(51) Int. Cl.
*H04W 88/02* (2009.01)
(52) U.S. Cl.
USPC ...................................... 455/432.1
(58) Field of Classification Search
USPC .................... 455/432.1, 405–406
See application file for complete search history.

(56) References Cited

U.S. PATENT DOCUMENTS

| | | | |
|---|---|---|---|
| 2010/0311392 A1* | 12/2010 | Stenfelt et al. | 455/411 |
| 2011/0021216 A1* | 1/2011 | Pudney et al. | 455/466 |
| 2012/0021741 A1* | 1/2012 | Pancorbo Marcos et al. | 455/433 |
| 2012/0302196 A1* | 11/2012 | Chin et al. | 455/404.1 |

OTHER PUBLICATIONS

3GPP TR 23.842 v0.3.0, Dec. 1, 2010 (see p. 24), 3GPP, see pp. 1 and 24.*
3GPP Organizational Partners, "3rd Generation Partnership Project; Technical Specification Group Services and System Aspects; Study on Network Provided Location Information to the IMS; (Release 11)" 3GPP TR 23.842 V0.3.0, Nov. 2010, 23 pages.

* cited by examiner

*Primary Examiner* — Diane Mizrahi

(57) ABSTRACT

A method may include receiving a request from an Internet Protocol Multimedia Subsystem, where the request relates to an Internet Protocol Multimedia Subsystem service associated with user equipment. The method may further include obtaining location or time zone information associated with the user equipment from an access network; providing the obtained location or time zone information to the Internet Protocol Multimedia Subsystem; and providing the obtained location or time zone information to an on-line or off-line charging system.

21 Claims, 11 Drawing Sheets

PROVIDING USER LOCATION AND TIME ZONE INFORMATION FOR LTE/IMS CHARGING

BACKGROUND INFORMATION

Mobile communication devices, such as cell phones, may utilize the Internet for telephone calls, or other multimedia services, using an architectural framework known as the Internet Protocol (IP) Multimedia Subsystem (IMS). IMS may be utilized in connection with a wireless network based on a Third Generation Partnership Project (3GPP) Long Term Evolution (LTE) standard. A mobile communication device may connect to the IMS using an access network and may send a Session Initiation Protocol (SIP) message to the IMS during call setup. The SIP message may include location information associated with the mobile communication device. The location information may be used by the IMS to determine charging information. However, the location information, included in a SIP message from the mobile communication device, may be viewed as unreliable because it is not provided by the network.

DETAILED DESCRIPTION OF PREFERRED EMBODIMENTS

Figure 1:
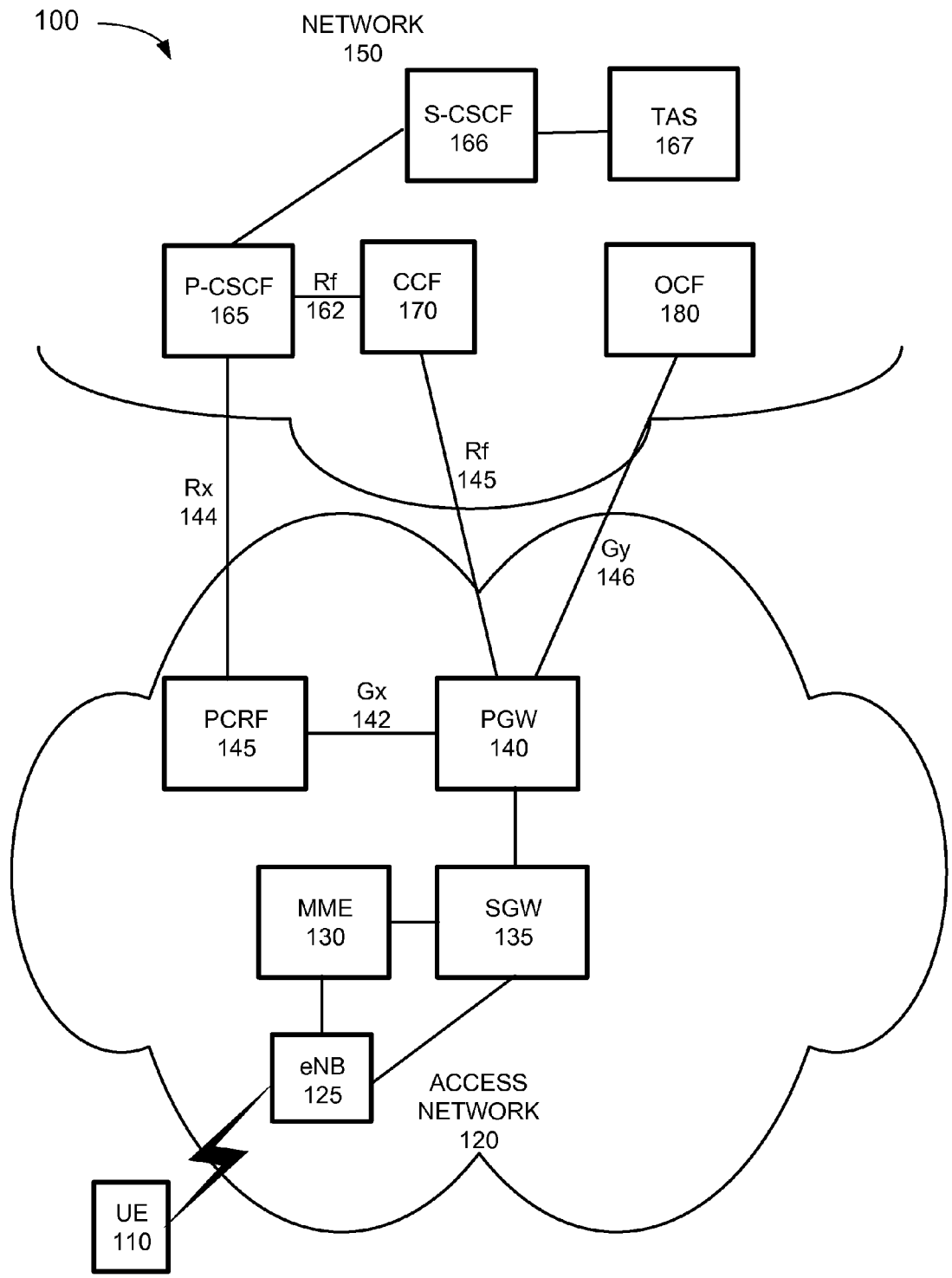
FIG. 1 is a diagram illustrating an example environment according to an implementation described herein.

The following detailed description refers to the accompanying drawings. The same reference numbers in different drawings identify the same or similar elements.

When determining charges for a call sent or received by a mobile communication device (referred to herein as user equipment (UE)), a charging system may need to receive location information and/or time zone information associated with the UE. Different locations may be associated with different rates used to compute charges. Furthermore, different times of day may be associated with different rates as well. For example, calls made during the day may be associated with a higher rate than calls made during evening hours. The time zone information may be necessary to determine which rate to apply to a phone call. Furthermore, the location and/or time zone information may change during a call. For example, a UE may transition from one time zone to another time zone, which may require an adjustment from a day rate to an evening rate if the local time change for the UE results in a change from day hours to evening hours. Therefore, tracking location and/or time zone information for a UE during call set up, call release, and/or call modification may be necessary to determine correct charges for the call.

An implementation described herein may relate to providing user location information (ULI), which is available at a mobility management entity (MME), and/or time zone information that may be determined by the MME using the ULI, to an IMS network. The MME may include the ULI and/or the time zone information, associated with the UE, in a create bearer response message, a delete bearer response message, and/or an update bearer response message to a serving gateway (SGW), and the SGW may forward the response message to a packet data network gateway (PGW) associated with the UE. The MME may always knows the ULI (e.g., Tracking Area Identity (TAI) and/or E-UTRAN Cell Global Identifier (ECGI)) of a registered UE, and a network operator may prefer using the information from MME for charging, because location information received from an MME may be more reliable than location information from another source (such as, for example, location information provided directly by the UE).

An implementation described herein may further relate to a PGW waiting to respond to a message from a Policy Charging and Rules Function (PCRF) until a create bearer response message, a delete bearer response message, and/or an update bearer request message has been received from an MME via an SGW. The reply to the PCRF message may include the user location information (ULI) and/or time zone information received from the MME. The PCRF may receive the ULI and/or time zone information of a UE and may provide the ULI and/or time zone information of the UE to the IMS.

An implementation described herein may further relate to providing ULI and/or time zone information to an online charging function (OCF) that handles calls associated with prepaid subscribers. The PGW may send the ULI and/or time zone information, associated with the UE, to the OCF so that the OCF may use the received ULI and/or time zone information in computing charges for a call. The OCF may deny or authorize a network element in an IP network (e.g., serving call session control function (S-CSCF) or telephony application server (TAS) in an IMS network) or a network element in an access network (e.g., a PGW in a LTE network) that provides service to the UE, depending on whether the subscriber account balance has sufficient fund to cover the computed charges.

An implementation described herein may further relate to providing ULI and/or time zone information to an offline charging collection function (CCF). An element in an LTE network (e.g., a PGW), and/or an element in an IMS network (e.g., a S-CSCF and/or a TAS), may generate charging data and send the charging data to the CCF via a Diameter Protocol message. The CCF may perform charging data correlations, may create a call detail record (CDR) for billing, and may send the CDR to an external billing system.

FIG. 1 is a diagram of an example environment 100 in which the systems and/or methods, described herein, may be implemented. As shown in FIG. 1, environment 100 may include UE 110, access network 120, and network 150.

UE 110 may include any wireless communication device that a user may use to connect to access network 120. UE 110 may include, for example, a mobile communication device, such as a mobile phone, a personal digital assistant (PDA), or a media playing device with communication capabilities; a desktop device, such as a personal computer or a workstation; a laptop computer; a tablet computer; a telephone terminal; or other similar types of communication devices or combinations thereof.

Access network 120 may include an evolved packet core (EPC) network based on the Long Term Evolution (LTE) standard specified by the 3$^{rd}$ Generation Partnership Project (3GPP). Access network 120 may include one or more devices that implement logical entities interconnected via standardized interfaces and that provide packet-switched services between UE 110 and IP network 150. Access network 120 may include eNodeB (eNB) 125, MME 130, SGW 135, PGW 140, and PCRF 145.

eNB 125 may include a wireless transceiver and may include one or more devices that provide functionality necessary to establish a wireless connection between UE 110 and access network 120. MME 130 may include one or more devices that implement control plane processing for access network 120. For example, MME device 310 may select a particular SGW 135 for a particular UE 110, may implement tracking and paging procedures for UE 110, may activate, delete, and deactivate bearers for UE 110, and may interface to non-LTE radio access networks. When UE 110 is registered with access network 120, MME 130 may keep track of the ULI of UE 110 so that it may page the UE 110 for an incoming call or data packets. For example, ULI may include a Tracking Area Identity (TAI) and/or an E-URTAN Cell Global Identifier (ECGI). MME 130 may derive the time zone information associated with UE 110 using the ULI and may provide the ULI and/or time zone information to PGW 140 via SGW 135.

SGW 135 may include one or more devices that provide an access point to and from UE 110, may handle forwarding of data packets for UE 110, and may act as a local anchor point during hand-over procedures between different eNBs. PGW 140 may include one or more devices that function as a gateway to an IP network (e.g., IP network 150). UE 110, while connected to a single SGW 135, may be connected to multiple PGWs 140 (e.g., one for each IP network with which UE 110 communicates). PGW 140 may assign an IP address to UE 110. PGW 140 may receive a re-authorization request from PCRF 145, may wait to obtain location and/or time zone information from MME 130, via SGW 135, and provide a re-authorization answer to PCRF 145 that includes the obtained location and/or time zone information.

PCRF 145 may include one or more devices that perform a policy charging and rules function for access network 120. For example, PCRF 145 may establish QoS requirements, bandwidth, and/or charges for a particular bearer associated with UE 110. PCRF 145 may receive information from P-CSCF 165, with respect to a particular data flow managed by IMS network 160 with respect to UE 110, over Rx interface 144, may determine appropriate PCRF parameters for the particular data flow, and may provide the determined PCRF parameters to PGW 140 over Gx interface 142.

Network 150 may include one or more wired and/or wireless networks. Network 150 may allow the delivery of Internet Protocol (IP) services to UE 110 and may interface with other external networks. Network 150 may include an IP Multi-media subsystem (IMS) network, a local area network (LAN), a wide area network (WAN), a metropolitan area network (MAN), an optical network, a cable television network, a satellite television network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks.

As shown, network 150 may a proxy call session control function (P-CSCF) 165, a serving call session control function (S-CSCF) 166, and a telephony application server (TAS) 167, a charging collection function (CCF) 170, and an on-line charging system (OCF) 180. Network 150 may deliver IP multimedia services as specified by 3GPP and may provide a Voice over IP (VoIP) service to UE 110 using Session Initiation Protocol (SIP). In some implementations, P-CSCF 165, S-CSCF 166, and/or TAS 167 may be implemented as one, or as more than one, physical element.

P-CSCF 165 may include one or more devices that may function as a SIP proxy that provides a signaling path between UE 110 and IMS network 160, may inspect messages sent from UE 110 to IMS network 160, may authenticate UE 110, and/or may perform policy control and/or generate charging data associated with a session in IMS network 160 and provide charging data information to PCRF 145. For example, P-CSCF 165 may send an authentication authorization request to PCRF 145 and may receive an authentication authorization answer from PCRF 145 that includes ULI and/or time zone information of UE 110 from MME 130.

P-CSCF 165 may provide the received ULI and/or time zone information to CCF 170 over Rf interface 162. In one implementation, P-CSCF 165 may forward ULI and/or time zone information in a SIP signaling message to the S-CSCF 166 so that S-CSCF 167 may provide this information to CCF 170 and/or to OCF 180. In another implementation, S-CSCF 167 may forward the ULI and/or time zone information of UE 110, received from P-CSCF, in a SIP signaling message to an application server (e.g., TAS 167) and the application server may forward the ULI and/or time zone information to CCF 170 and/or to OCF 180.

S-CSCF 166 may manage sessions in the IMS network and may interact with a home subscriber server (HSS) (not shown in FIG. 1) to manage user profiles associated with users of UE devices 110. S-CSCF component 166 may receive messages from P-CSCF 165 and decide to which application server to forward particular messages. TAS 167 may perform various functions relating to the IMS, such as, for example, one or more of computing charges for a call handled by IMS, authorizing toll-free calls, performing call forwarding, handling call conferencing, and/or any other telephony function.

CCF 170 may include one or more devices that perform off-line charging data collection functions for a service provided by IMS network 160 (e.g., for a VoIP call handled by IMS network 160) and/or access network 120 (e.g., a data session to IP network 150). CCF 170 may receive charging data for a particular call/service provided to UE 110, including the ULI and/or time zone information associated with UE 110, from P-CSCF 165, S-CSCF, IMS application server (e.g., TAS), and/or PGW 140 and may use the received ULI and/or time zone information in determining the charges for the service. For example, CCF 170 may receive the ULI and/or time zone information from PGW 140 over an Rf interface 145. In another implementation, CCF 170 may generate a CDR using the received charging data from one or more senders, and may include the ULI and/or time zone information associated with UE 110, in the CDR. CCF 170 may send the CDR to an external billing system.

OCF 180 may include one or more devices that handle online charging for IMS network 160. Online charging may be used to determine charges for services at particular intervals on a real-time basis and/or may be used for pre-paid services (e.g., a calling card). OCF 180 may receive ULI and/or time zone information, associated with UE 110, from PGW 140 and may use the ULI and/or time zone information in determining the on-line charges for the service. Based on the subscriber available account balance and the determined charges for the service, OCF 180 may authorize or deny service to UE 110 depending on whether the subscriber account balance is sufficient to cover the determined charge. In another implementation, OCF 180 may receive the ULI and/or time zone information, associated with UE 110, from S-CSCF 166 or from an application server, such as TAS 167.

Although FIG. 1 shows example components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
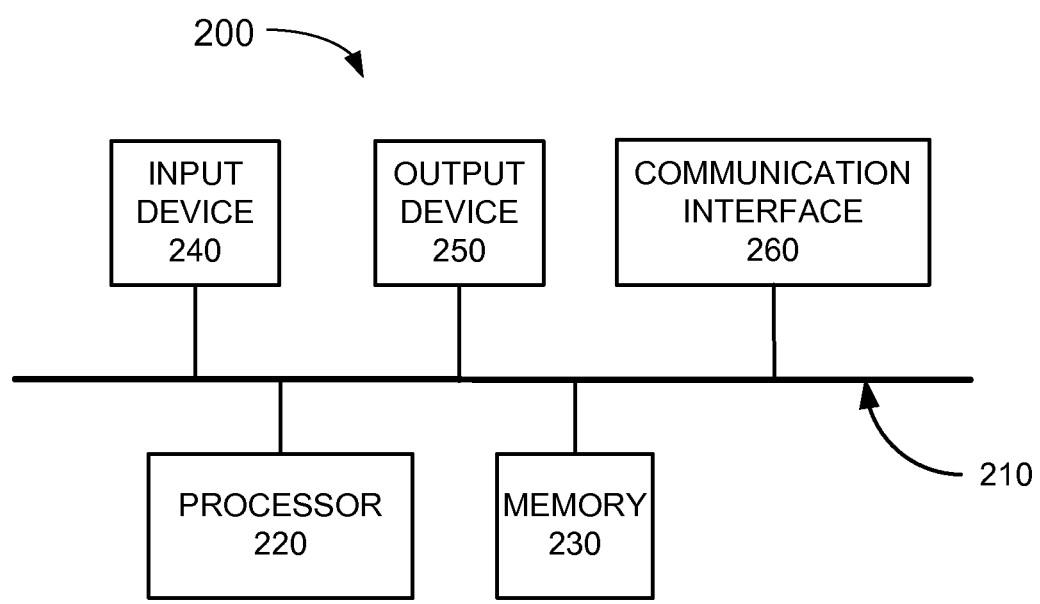
FIG. 2 is a diagram illustrating example components associated with one or more of the devices of FIG. 1.

FIG. 2 is a diagram of example components of a device 200 that may correspond to UE 110, eNB 125, MME 130, SGW 135, PGW 140, PCRF 145, P-CSCF 165, S-CSCF 166, TAS 167, CCF 170, and/or OCF 180. Alternatively, each of UE 110, eNB 125, MME 130, SGW 135, PGW 140, PCRF 145, P-CSCF 165, S-CSCF 166, TAS 167, CCF 170, and/or OCF 180 may include one or more devices 200.

As shown in FIG. 2, device 200 may include a bus 210, a processor 220, a memory 230, an input device 240, an output device 250, and a communication interface 260. Bus 210 may include a path that permits communication among the components of device 200. Processor 220 may include a single-core processor, multi-core processor, microprocessor, and/or processing logic that may interpret and execute instructions. Memory 230 may include any type of dynamic storage device that may store information and instructions, for execution by processor 220, and/or any type of non-volatile storage device that may store information for use by processor 220.

Input device 240 may include a mechanism that permits a user to input information to device 200, such as a keyboard, a keypad, a button, a switch, etc. Output device 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as access network 120 and/or IP network 150. In one alternative implementation, communication interface 260 may be a logical component that includes input and output ports, input and output systems, and/or other input and output components that facilitate the transmission of data to other devices.

As will be described in detail below, device 200 may perform certain operations relating to processing location and/or time zone information with respect to computing charges for a call. Device 200 may perform these and other operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Additionally or alternatively, one or more components of device 200 may perform functions described as being performed by one or more other components of device 200.

Figure 3:
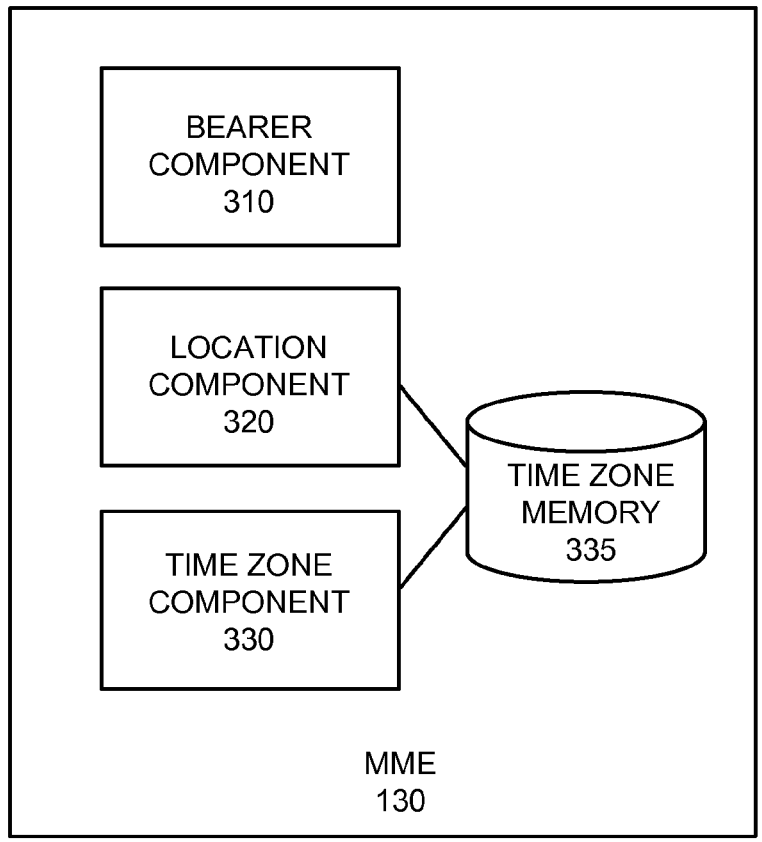
FIG. 3 is a diagram illustrating example functional components of a mobility management entity of FIG. 1.

FIG. 3 is a diagram illustrating example functional components of MME 130. The functional components of MME 130 may be implemented as a result of processor 220 executing instructions from memory 230. As shown in FIG. 3, MME 130 may include a bearer component 310, a location component 320, a time zone component 330, and a time zone memory 335.

Bearer component 310 may provide instructions to eNB 125 to activate, delete, and/or update bearers based on a bearer request received from PGW 140 via SGW 135. A bearer may provide a connection between UE 110 and SGW 135 via eNB 125 and between SGW 135 and PGW 140 for transporting IP traffic. Each bearer may be associated with a particular IP address, a particular bandwidth, and/or a particular set of quality of service (QoS) requirements. When UE 110 places a call or receives a call, bearer component 310 may set up a dedicated bearer for the call between UE 110 and PGW 140 via eNB 125 and SGW 135. When the call ends, bearer component 310 may delete the bearer. If MME 130 determines that a call needs to be modified, bearer component 310 may instruct eNB 125 to modify the bearer. A bearer may need to be modified when, for example, a call is put on hold or when an active call otherwise becomes inactive, and/or when bandwidth or QoS requirements associated with the bearer need to be modified (e.g., by adding another media type to the call).

Location component 320 may keep track of the current location of UE 110. For example when UE 110 is present in the coverage of eNB 125, it may send an RRC connection request message to eNB 125, eNB 125 may select an MME 130, and may send an attach request message, which includes a TAI and/or ECGI, to the selected MME 130. Location component 320 may store the location information for paging UE 110 at a later time, when there is an incoming call or packet data destined for UE 110. For example, when UE110 detects a change of a tracking area or when a TAU timer expires, UE 110 may send a tracking area update (TAU) request to eNB 125, and eNB 125 may forward the TAU request in an initial UE message (if UE 110 is in idle mode) or in a UL NAS transport message (if UE 110 is in connected mode) and eNB 125 may include the current TAI and ECGI in the message to MME 130. Location component 320 may refresh its location data for UE 110 at particular intervals.

Time zone component 330 may obtain and store current time zone information associated with UE 110. For example, time zone component 330 may access time zone memory 335 to determine a current time zone associated with UE 110 based on the current location of UE 110. Time zone memory 335 may store information about a time zone associated with a particular location represented by, for example, a combination of TAI and ECGI.

Although FIG. 3 shows example functional components of MME 130, in other implementations, MME 130 may include fewer functional components, different functional components, differently arranged functional components, or additional functional components than depicted in FIG. 3. Additionally or alternatively, one or more functional components of MME 130 may perform functions described as being performed by one or more other functional components of MME 130.

Figure 4:
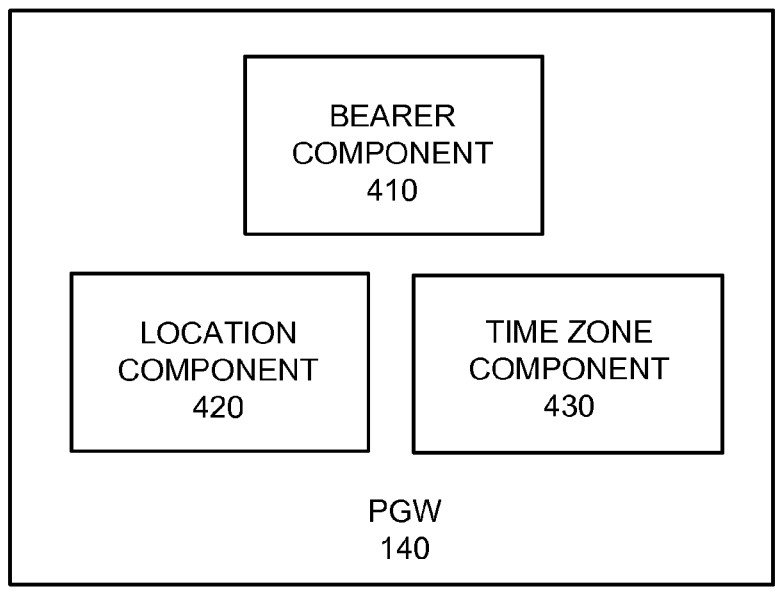
FIG. 4 is a diagram of example functional components of a packet data network gateway of FIG. 1.

FIG. 4 is a diagram of example functional components of PGW 140. The functional components of PGW 140 may be implemented as a result of processor 220 executing instructions from memory 230. As shown in FIG. 4, PGW 140 may include a bearer component 410, a location component 420, and a time zone component 430.

Bearer component 410 may create, delete, and/or modify a bearer for UE 110 based on, for example, re-authorization requests received from PCRF 145. Bearer component 410 may not respond to a re-authorization request received from PCRF 145 until location and/or time zone information, associated with UE 110, is received from MME 130 via SGW 135. Location component 420 may receive location information about UE 110 from MME 110 and provide the location information to PCRF 140. Time zone component 430 may receive time zone information about UE 110 from MME 110 and provide the location information to PCRF 140

Although FIG. 4 shows example functional components of PGW 140, in other implementations, PGW 140 may include fewer functional components, different functional components, differently arranged functional components, or additional functional components than depicted in FIG. 4. Additionally or alternatively, one or more functional components of PGW 140 may perform functions described as being performed by one or more other functional components of PGW 140.

Figure 5:
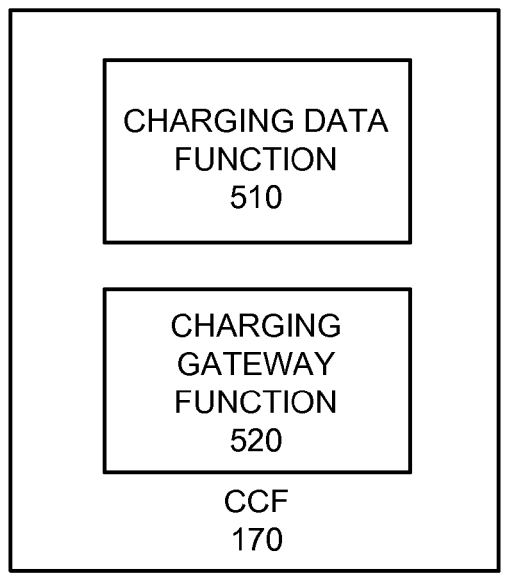
FIG. 5 is a diagram of example functional components of a charging collection function of FIG. 1.

FIG. 5 is a diagram of example functional components of CCF 170. The functional components of CCF 170 may be implemented as a result of processor 220 executing instructions from memory 230. As shown in FIG. 5, CCF 170 may include a charging data function (CDF) 510 and a charging gateway function (CGF) 520.

CDF 510 may receive an accounting request message that may include charging data, ULI and/or time zone information, from a network element in network 150 and/or access network 120 associated with a particular service (e.g., a call) provided to UE 110. CDF 510 may send an accounting answer to the sender of the accounting request message in response to the accounting request message.

CGF 520 may correlate and/or consolidate charging data records received by CDF 510 from a same element or from different elements (e.g. P-CSCF 165, S-CSCF 166, TAS 167, and/or PGW 140) into a single call detail record (CDR). Charging gateway function 520 may perform call rating, using the correlated and/or consolidated location and/or time zone information associated with UE 110. CGF 520 may perform a billing function locally or may send the CDR to an external billing system.

Although FIG. 5 shows example functional components of CCF 170, in other implementations, CCF 170 may include fewer functional components, different functional components, differently arranged functional components, or additional functional components than depicted in FIG. 5. Additionally or alternatively, one or more functional components of CCF 170 may perform functions described as being performed by one or more other functional components of CCF 170.

Figure 6:
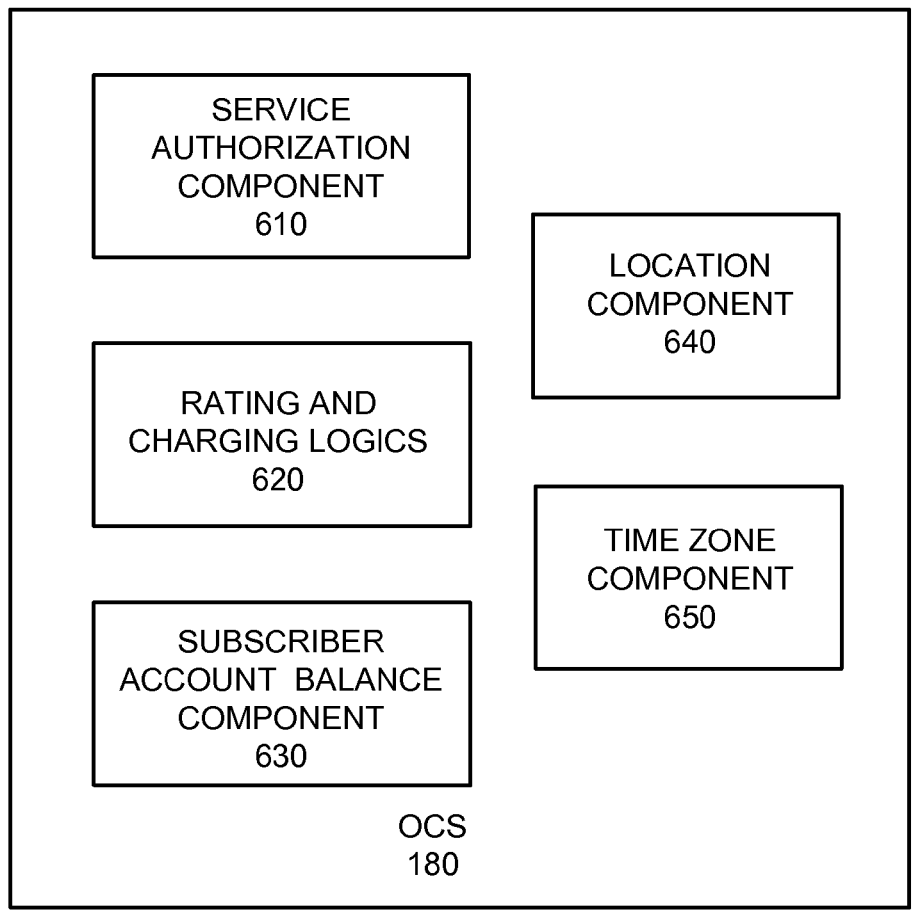
FIG. 6 is a diagram of example functional components of an online charging system of FIG. 1.

FIG. 6 is a diagram of example functional components of OCF 180. The functional components of OCF 180 may be implemented as a result of processor 220 executing instructions from memory 230. As shown in FIG. 6, OCF 180 may include a service authorization component 610, a rating and charging logics component 620, a subscriber account balance component 630, a location component 640, and a time zone component 650.

Service authorization component 610 may authorize or deny a particular service for UE 110 based on computed charges and based on an account balance. Rating and charging logics component 620 may calculate charges for a particular service associated with UE 110. Subscriber account balance component 630 may determine a subscriber balance associated with UE 110. Location component 640 may store a current location component for UE 110 and time zone component 650 may store a current time zone location for UE 110.

For example, service authorization component 610 may receive a Diameter protocol message (e.g., a re-authorization request message or an credit control message) that includes the ULI and time zone information for UE 110, may update the location information stored in location component 640 for UE 110, and may update the time zone information stored in time zone component 650 for UE 110. Service authorization component 610 may receive a Diameter protocol message (e.g., re-authorization request or a credit control request) from PGW 140, S-CSCF 166, and/or TAS 167 for a particular service (e.g., a call) for UE 110 and may provide the request to rating and charging logics component 620. Rating and charging logics 620 may compute the charges for the service, while taking into account the current location and time zone information of UE 110, obtained from location component 640 and time zone component 650, and may provide the computed charges to service authorization component 610. Service authorization 610 may communicate with subscriber account balance component 630 about the charge. If there are sufficient funds in the account associated with UE 110, subscriber account balance component 630 may apply the charges to the balance, may update the balance, and may inform service authorization component 610 about its action. Service authorization component 610 may send a response (e.g., a re-authorization answer or a credit control answer) to the sender (e.g., PGW 140, S-CSCF 166, TAS 167, etc) to authorize the service or provide a specific credit amount. If there are insufficient funds to cover the charges, subscriber account balance component 630 may inform service authorization component 610, and service authorization component 610 may send back a response to the sender denying the service to UE 110.

Although FIG. 6 shows example functional components of OCF 180, in other implementations, OCF 180 may include fewer functional components, different functional components, differently arranged functional components, or additional functional components than depicted in FIG. 6. Additionally or alternatively, one or more functional components of OCF 180 may perform functions described as being performed by one or more other functional components of OCF 180.

Figure 7:
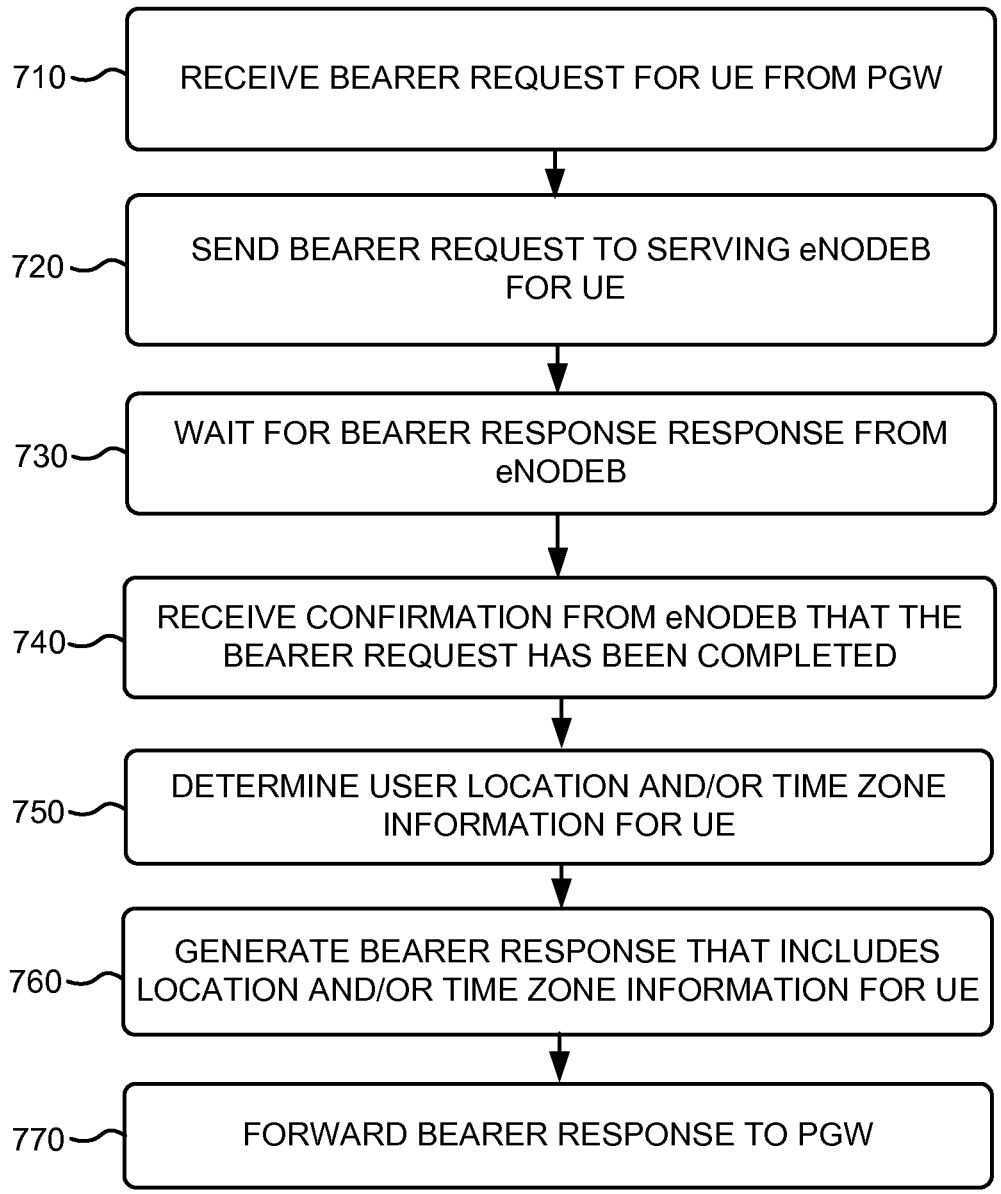
FIG. 7 is a flow chart of an example process for providing location and/or time zone information in a bearer response according to an implementation described herein.

FIG. 7 is a flow chart of an example process for providing location and time zone information in a bearer response. In one implementation, the process of FIG. 7 may be performed by MME 130. In other implementations, some or all of the process of FIG. 7 may be performed by another device or a group of devices separate from and/or including MME 130.

The process of FIG. 7 may include receiving a bearer request from a PGW (block 710). For example, MME 130 may receive a bearer request, on behalf of UE 110, from PGW 140 via SGW 135. The bearer request may be a create bearer request to set up a new bearer, an update bearer request to modify an existing bearer, or a delete bearer request to tear down an existing bear for UE 110.

A bearer request may be sent to a serving eNodeB (block 720). For example, MME 130 may send a bearer request to eNB 125. If the bearer request received from PGW 140 includes a create bearer request, MME 130 may send an Evolved Universal Terrestrial Radio Access bearer (E-RAB) setup request to eNB 125. If the bearer request received from PGW 140 includes an update bearer request, MME 130 may send a downlink non-access stratum (NAS) transport message to eNB 125. If the bearer request received from PGW 140 includes a delete bearer request, MME 130 may send a deactivate bearer request to eNB 125.

Waiting for a bearer response from the serving eNodeB may be performed (block 730). For example, MME 130 may wait for a response from eNB 125. A confirmation may be received from the serving eNodeB that the bearer request has been completed (block 740). For example, eNB 125 may communicate to UE 110 about the bearer request and may respond to MME 110, after UE 110 replies to eNB 125, indicating that the bearer request has been successfully executed.

A user location and/or time zone information may be determined for the UE (block 750). For example, MME 130 may receive the current ULI of UE 110 from eNB 125 in response to the bearer request. As another example, MME 130 may have received the current ULI of UE 110 from eNB 125 during a previous communication with eNB 125. Furthermore, MME 130 may determine the current time zone information for UE 110 based on the current ULI of UE 110. For example, MME 130 may determine a time zone associated with the current ULI by accessing time zone memory 335. In some implementations, block 750 may be executed before, after, or concurrently with, block 740.

The current ULI and/or time zone information may be included in a bearer response (block 760). For example, MME 130 may include the current ULI and/or time zone information in a bearer response that is to be sent to PGW 140. The bearer response may include a create bearer response, an update bearer response, or a delete bearer response. The bearer response may be forwarded (block 770). For example, MME 130 may send a create bearer response for a create bearer request, a delete bearer response for a delete bearer request, or an update bearer response for an update bearer request to PGW 140, via SGW 135, confirming that the bearer request has been executed successfully for UE 110.

Figure 8:
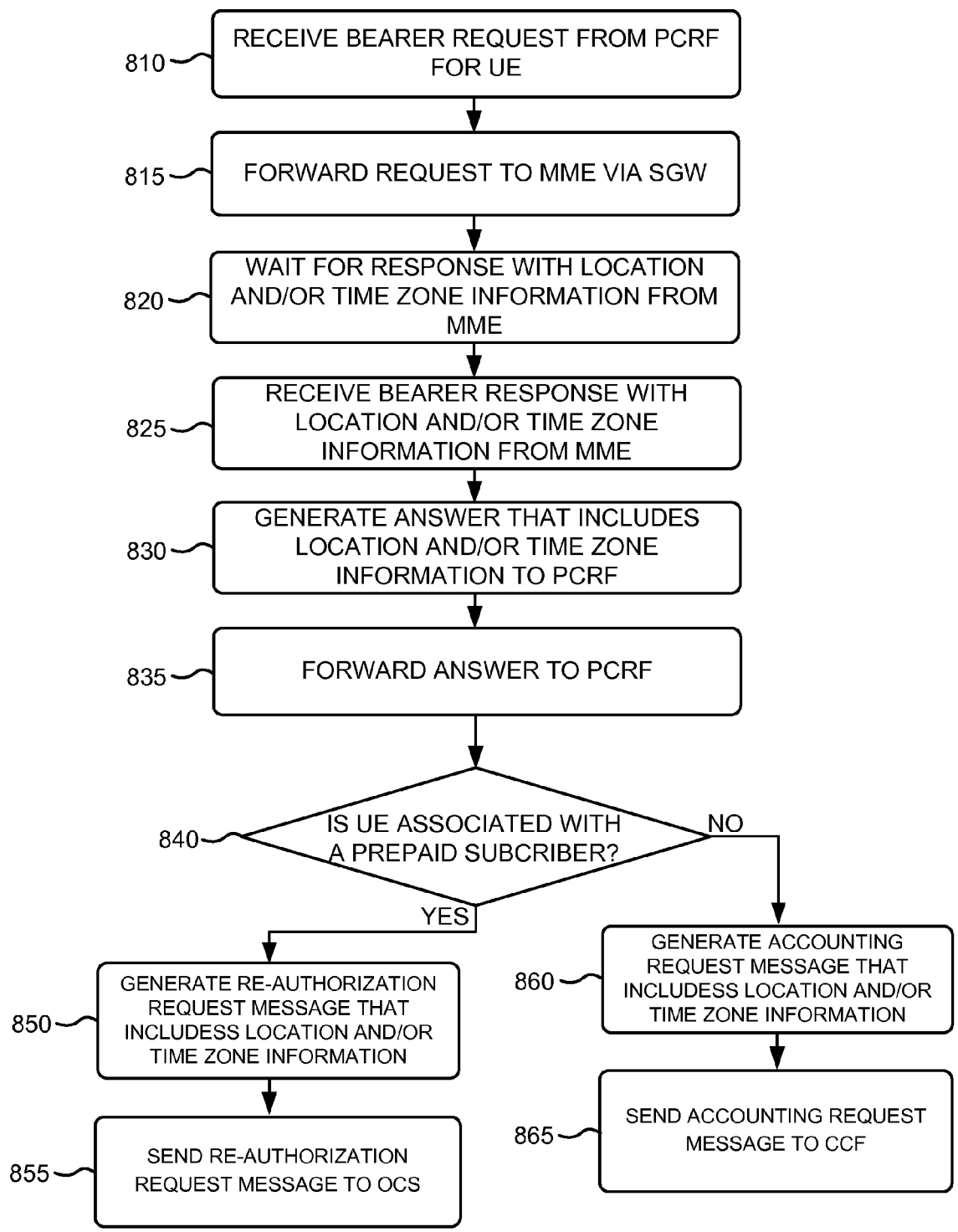
FIG. 8 is flow chart of an example process for generating a re-authorization request that includes location and/or time zone information according to an implementation described herein.

FIG. 8 is flow chart of an example process for generating and sending an accounting request and/or a re-authorization request, which includes location and/or time zone information, to CCF 170 and/or OCF 180, respectively. In one implementation, the process of FIG. 8 may be performed by PGW 140. In other implementations, some or all of the process of FIG. 8 may be performed by another device or a group of devices separate from and/or including PGW 140.

The process of FIG. 8 may include receiving a bearer request, associated with a UE, from a PCRF (block 810) and forward the received bearer request to an MME via an SGW (block 820). For example, PGW 140 may receive a re-authorization request from PCRF 145 with instructions about a bearer connection for UE 110 on behalf of an IMS service. The re-authorization request may include a bearer request to set up, tear down, or modify a bearer connection for a UE from PCRF 145. The bearer request may be forward to MME 130 via SGW 135. For example, PGW 140 may send a create bearer request, update bearer request, or delete bearer request to MME 130.

Waiting may occur for a response from an MME that includes ULI and/or time zone information associated with the UE (block 820). For example, PGW 140 may not respond to PCRF 145 until a response is received from MME 130, where the response includes the current ULI and/or time zone information associated with UE 110.

A bearer response may be received with ULI and/or time zone information (block 825), an answer to the PCRF request may be generated that includes the received ULI and/or time zone information (block 830), and the answer to the PCRF request may be forwarded (block 835). For example, PGW 140 may receive a create bearer response, update bearer response, or delete bearer response from MME 130 with the current ULI and/or time zone information associated with UE 110. PGW 140 may generate a Diameter protocol re-authorization answer that includes the ULI and time zone information, and may forward the re-authorization answer over Gx interface 142 to PCRF 145. PCRF 145 may provide the ULI and/or time zone information of UE 110 to P-CSCF 165 over Rx interface 144 so that the IMS network may use this information for billing purposes.

A determination may be made as to whether the UE is associated with a prepaid subscriber (block 840). For example, PGW 140 may access a database of prepaid subscribers to determine whether UE 110 is associated with a pre-paid subscriber. In one implementation, the database may be maintained by PGW 140. In another implementation, the database may be maintained by another device (e.g., MME 130, a home subscriber server, an application server associated with an IMS network, etc.). As another example, PGW 140 may determine that UE 110 is associated with a prepaid subscriber based on information received from MME 130, without having to access a database of prepaid subscribers.

PGW 140 may use an identifier associated with UE 110 when determining whether UE 110 is associated with a prepaid subscriber. The identifier may include, for example, a username and password, a prepaid calling card number, a Mobile Subscriber Integrated Services Digital Network number (MSISDN), an International Mobile Subscriber Identity (IMSI) number, a mobile identification number (MIN), or an International Mobile Equipment Identifier (IMEI), an Integrated Circuit Card Identifier (ICCI), and/or any other mobile communication device identifier.

If the UE is associated with a prepaid subscriber (block 840—YES), a re-authorization request message, which includes the current ULI and/or time zone information, may be generated (block 850) and sent to an online charging function (block 855). For example, PGW 140 may generate a Diameter protocol message that includes the current ULI and/or time zone information and send the message over Gy interface 146 to OCF 180.

If the UE is not associated with a prepaid subscriber (block 840—NO), an accounting request message, which includes the current ULI and/or time zone information, may be generated (block 860) and sent to an offline charging collection function (block 865). For example, PGW 140 may generate a Diameter protocol message (e.g., an accounting request message) that includes ULI and/or time zone information of UE 110 and send the message over Rf interface 145 to CCF 170.

Figure 9:
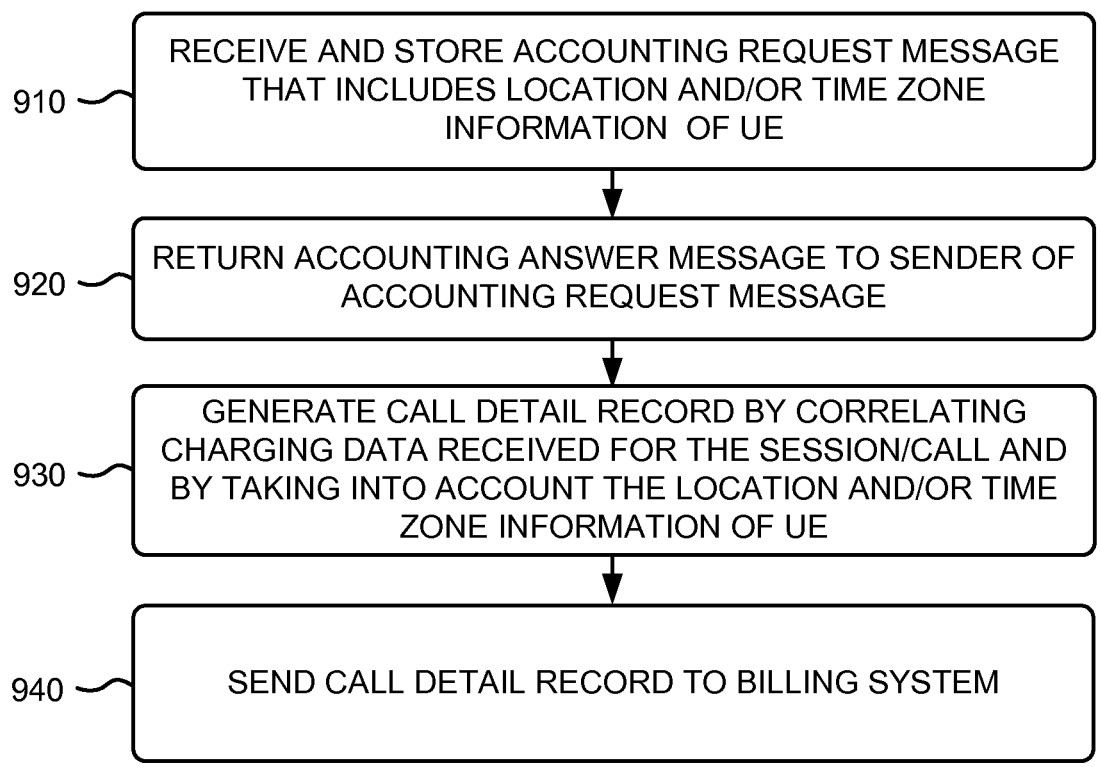
FIG. 9 is a flow chart of an example process for receiving an accounting request message that may include location and/or time zone information according to an implementation described herein.

FIG. 9 is a flow chart of an example process for receiving an accounting request that includes location and time zone information. In one implementation, the process of FIG. 9 may be performed by CCF 170. In other implementations, some or all of the process of FIG. 9 may be performed by another device or a group of devices separate from and/or including CCF 170.

The process of FIG. 9 may include receiving and storing an accounting request that includes ULI and/or time zone information of a UE (block 910). For example, CCF 170 may receive a Diameter protocol accounting request that includes ULI and/or time zone information of UE 110, with or without other charging data, over Rf interface 162 from P-CSCF 165 or Rf interface 145 from PGW 140. In another example, CCF 170 may receive ULI and/or time zone information, with or without other charging data, in an accounting request message from S-CSCF 166, and/or an IMS application server (e.g., TAS 167) over a Rf interface.

An accounting answer may be returned to the sender of the accounting request message (block 920) to acknowledge the accounting request message. For example, CCF 170 may send an accounting answer to P-CSCF 165, S-CSCF 166, PGW 140, or TAS 167.

A call detail record may be generated by correlating charging data received for the session and/or call and by taking into account the location and/or time zone information of the UE (block 930). For example, CCF 170 may collect and correlate charging data records for the same service/call of UE 110 and create a consolidated call detail record (CDR). CCF 170 may take into account the location and/or time zone information of UE 110 at call initiation, call modification, or call release, by, for example, using a time zone associated with UE 110, a local time associated with UE 110, and a charging rate associated with the local time to determine a particular rate to use in computing the charges for the service/call. For example, if the location is within an area associated with a particular subscription rate, associated with UE 110, and the call was made within hours associated with the particular subscription rate, the particular subscription rate may be used to compute the charges associated with the call and the computed charges may be added to a service bill associated with UE 110. CCF 170 may send the CDR to a billing system (block 940). In one example, CCF 170 may include a billing system. In another example, CCF 170 may send the CDR to an external billing system.

Figure 10:
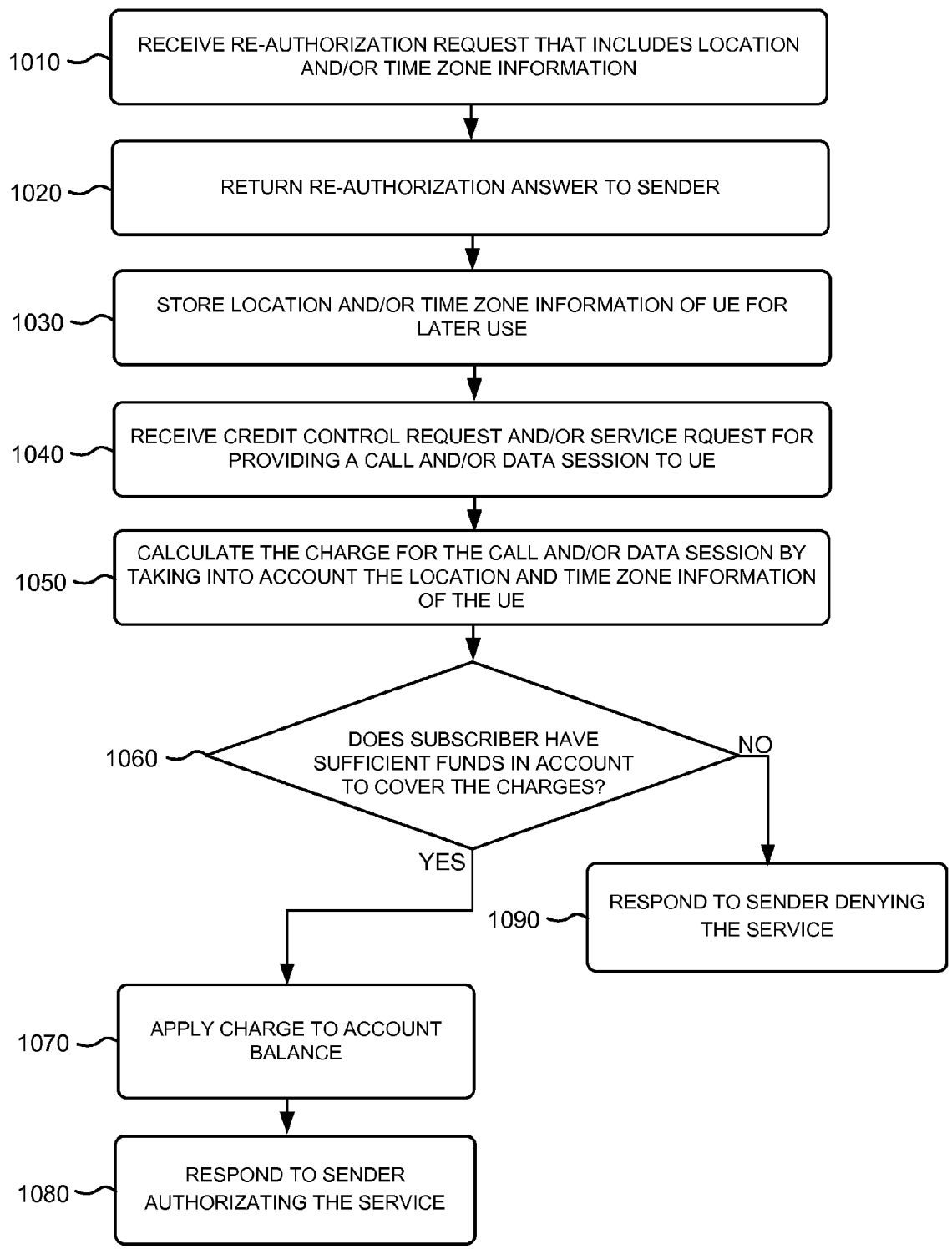
FIG. 10 is a flow chart of an example process for receiving an authorization message that may include location and/or time zone information of a user equipment and for using the location and time zone information to authorize a service request for a prepaid subscriber according to an implementation described herein.

FIG. 10 is a flowchart of an example process for generating an authorization answer. In one implementation, the process of FIG. 10 may be performed by OCF 180. In other implementations, some or all of the process of FIG. 10 may be performed by another device or a group of devices separate from and/or including OCF 180.

The process of FIG. 10 may include receiving a re-authorization request that includes location and/or time zone information (block 1010) and a re-authorization answer may be returned to the sender (block 1020). For example, OCF 180 may receive a Diameter protocol message (e.g., re-authorization request or credit control request) that includes ULI and/or time zone information over Gy interface 146 from PGW 140. A re-authorization answer to the Diameter protocol message may be generated and returned to the sender of the re-authorization request (e.g., to PGW 140). The ULI and time zone information received in the re-authorization request may be stored for later use (block 1030). For example, OCF 180 may store the ULI and/or time zone information in association with UE 110.

A credit control request and/or a service request for providing a call and/or a data session for the UE may be received (block 1040) and the charges for the call and/or data session may be calculated by taking into account the location and/or time zone information of the UE (block 1050). For example, when OCF 180 receives a Diameter protocol message (e.g., credit control request or re-authorization request) requesting authorization from a sender (e.g., PGW 140, S-CSCF 166, or TAS 167, etc.) to support a VoIP to UE 110, OCF 180 may determine on-line charges for the call based on the location and/or time zone information of UE 110 at call initiation, call modification and call release. For example, if the location is within an area associated with a particular charging rate, associated with UE 110, and the call was made within hours associated with the particular charging rate, the particular charging rate may be used to compute on-line charges associated with the call and the on-line charges may be applied to an account associated with a user of UE 110, such as, for example, a pre-paid calling card. The charges may be continued to be applied during the progression of the call (e.g., an amount associated with a pre-paid card may be decremented each minute by a particular amount based on the charging rate).

A determination may be made as to whether the subscriber has sufficient funds in the account to cover the charges (block 1060). For example, after charges are computed, OCF 180 may determine whether the user associated with UE 110 has sufficient funds in the corresponding subscriber account balance to cover the computed charges. If there are sufficient funds (block 1060—YES), the charges may be applied to the account (block 1070) and a response may be sent to the sender to authorize the service (block 1080). For example, OCF 180 may apply the charges to the subscribers account and may return an answer to the sender of the Diameter protocol request message authorizing the call to UE 110. If there aren't sufficient funds in the account (block 1060—NO), a response may be sent to the sender denying the service (block 1090). For example, OCF 180 may send back an answer to the sender of the Diameter protocol request message denying the call to UE 110.

Figure 11:
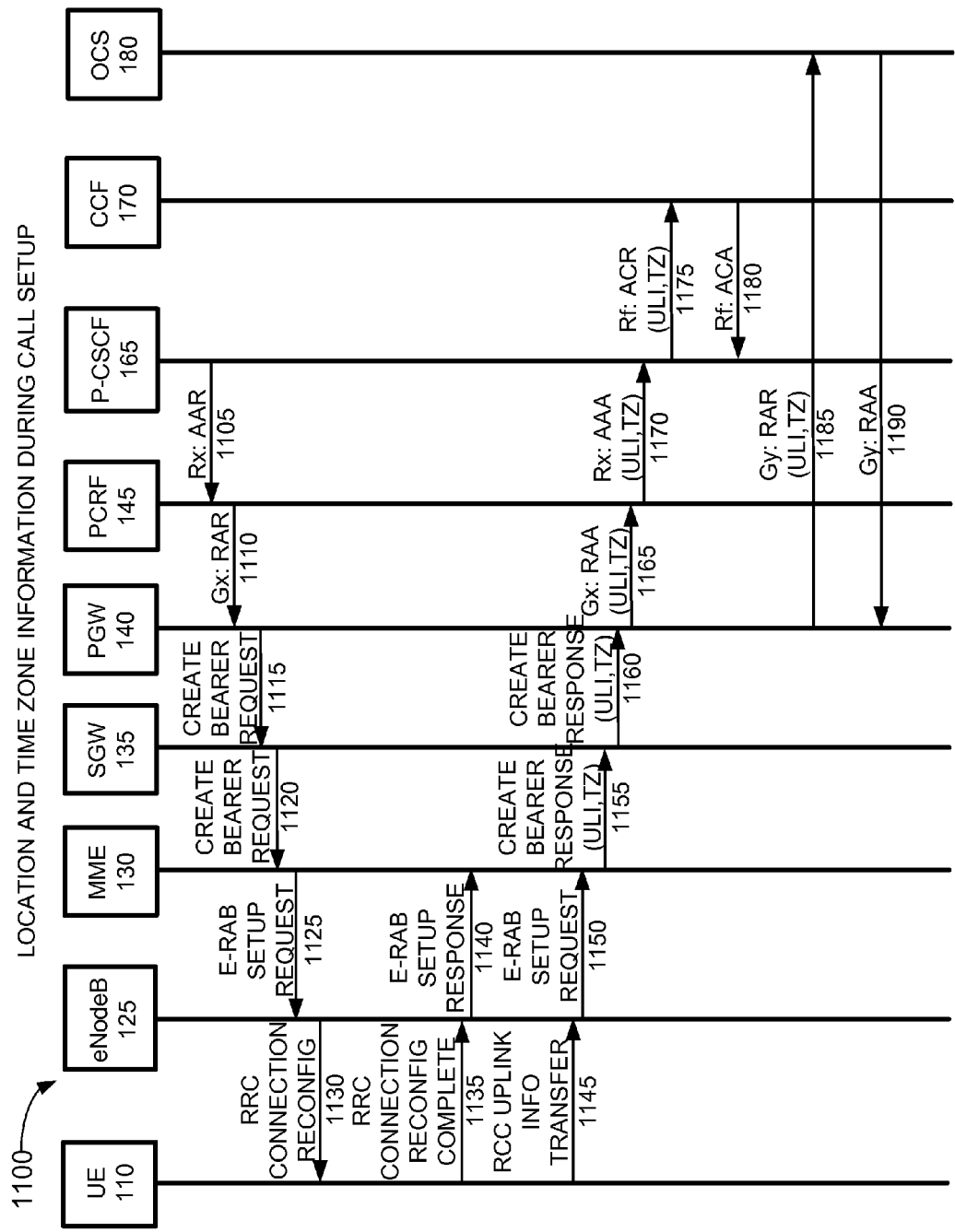
FIG. 11 is a diagram of an example signal flow during a call setup according to an implementation described herein.

FIG. 11 is a diagram of an example signal flow 1100 during a call setup. An IMS service may be initiated on behalf of UE 110 and P-CSCF 165 may send a service request to PCRF 145 requesting for bearer connection to support an IMS service (e.g., VoIP call) for UE 110. P-CSCF 165 may provide service-related information to PCRF 145, such as service description protocol (SDP) and/or traffic parameters that may allow access network 120 to establish the bearer connection with the appropriate QoS. Furthermore, access network 120 may need to authorize and set up a bearer for the service between PGW 140 and UE 110. Thus, as shown in FIG. 11, signal flow 1100 may include P-CSCF sending a Diameter protocol authentication authorization request (AAR) to PCRF 145 over Rx interface 144 (signal 1105). PCRF 145 may respond by sending a Diameter protocol re-authorization request (RAR) to PGW 140 over Gx interface 142 (signal 1110). The re-authorization request may include Policy and Charging Control (PCC) rules for the IP packet flow across the bearer dedicated for the service which may be enforced by bearer component 410 of PGW 140. PGW 140 may wait to receive location and time zone information from MME 130 before responding to the re-authorization request.

PGW 140 may send a create bearer request to SGW 135 (signal 1115) and SGW 135 may forward the create bearer request to MME 130 (signal 1120). MME 130 may send an Evolved Universal Terrestrial Radio Access bearer (E-RAB) setup request to eNB 125 (signal 1125). eNB 125 may respond by sending a Radio Resource Control (RRC) connection reconfiguration to UE 110 (signal 1130), which may set up control plane signaling between UE 110 and eNB 125.

UE 110 may send an RRC connection reconfiguration complete message to eNB 125 (signal 1135) and eNB may, in response, send an E-RAB setup complete response to MME 130 (signal 1140). Furthermore, UE 110 may send an RCC uplink information transfer message to eNB 125 (signal 1145). eNB 125 may, in response, send an E-RAB setup request to MME 130, which may include ULI (e.g., TAI and ECGI) of UE 110 (signal 1150).

MME 130 may determine time zone information associated with UE 110 and may include the current ULI and the determined time zone information in a create bearer response and send the create bearer response to SGW 135 (signal 1155) and SGW 135 may forward the create bearer response to PGW 140 (signal 1160). PGW 140 may now respond to the re-authorization request by sending a re-authorization answer (RAA) to PCRF 145 over Gx interface 142 (signal 1165). The re-authorization answer may include the current ULI and time zone information. PCRF 145 may, in response to receiving the re-authorization answer, send an authentication authorization answer to P-CSCF 165 over Rx interface 144 (signal 1170). The re-authorization answer may include the ULI and time zone information.

P-CSCF 165 may send a Diameter protocol accounting request (ACR) to CCF 170 over Rf interface 162 (signal 1175). The ACR message may include information about the IMS session associated with UE 110 that may allow CCF 170 to determine charges for the call. The included information may include the ULI and time zone information received from MME 130. CCF 170 may respond with a Diameter protocol accounting answer (ACA) over Rf interface 162 (signal 1180).

Figure 12:
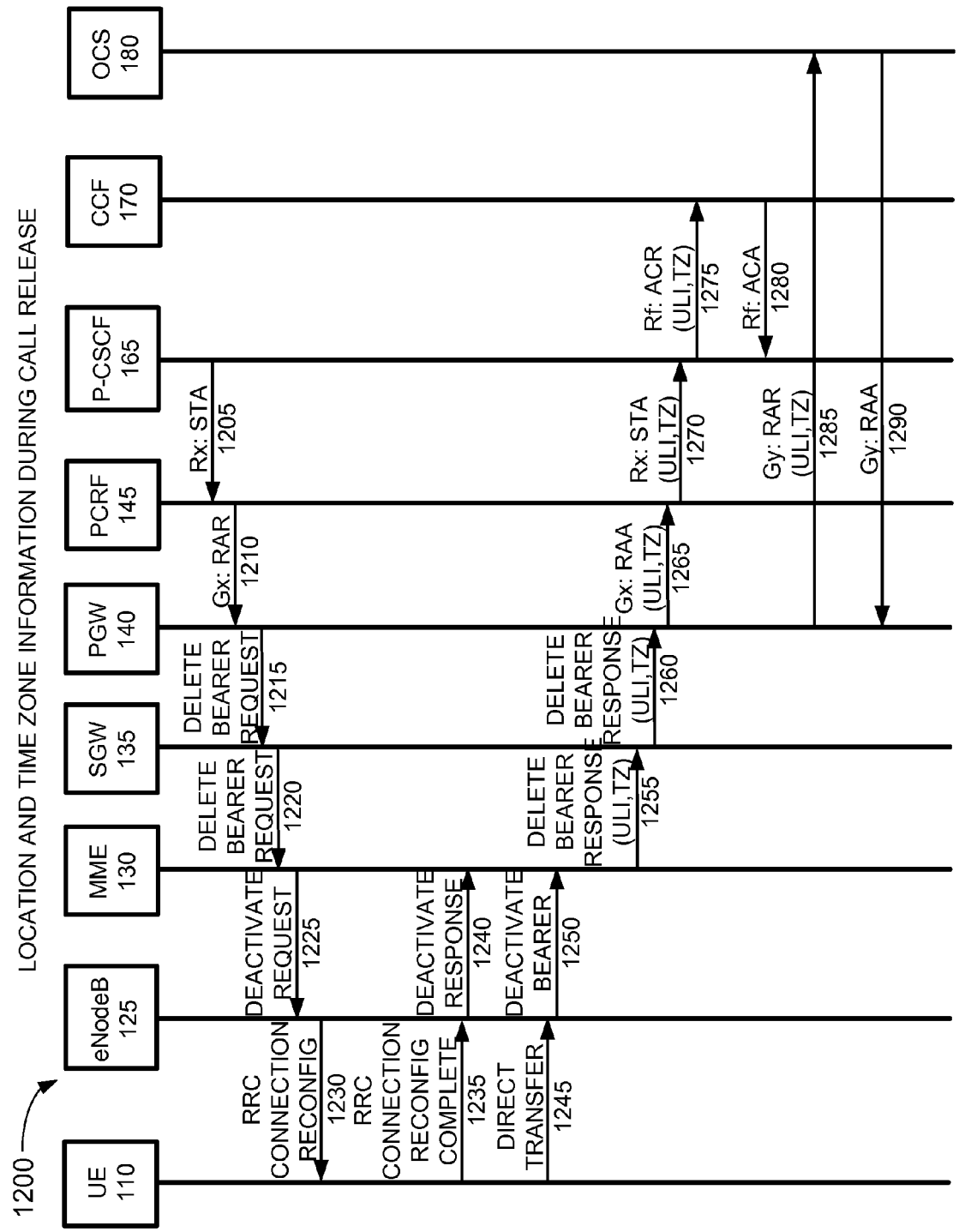
FIG. 12 is a diagram of an example signal flow during a call release according to an implementation described herein.

Furthermore, PGW 140 may send a Diameter protocol re-authorization request (RAR) to OCF 180 over Gy interface 146 (signal 1185), for example, when UE 110 is an OCF subscriber (e.g., a prepaid subscriber). The re-authorization request may include the ULI and time zone information of UE 110 received by PGW 140 from MME 130. OCF 180 may respond with a re-authorization answer (RAA) over Gy interface 146 (signal 1190). FIG. 12 is a diagram of an example signal flow 1200 during a call release in response to a phone call ending. When a phone call ends, resources associated with the set up bearer may need to be released. Thus, P-CSCF 165 may send a session termination answer (STA) to PCRF 145 over Rx interface 144 (signal 1205). PCRF 145 may respond by sending a Diameter protocol re-authorization request (RAR) to PGW 140 over Gx interface 142 (signal 1210). The re-authorization request may be an instruction to access network 120 to release the call. PGW 140 may wait to receive current location and time zone information from MME 130 before responding to the re-authorization request.

PGW 140 may send a delete bearer request to SGW 135 (signal 1215) and SGW 135 may forward the delete bearer request to MME 130 (signal 1220). MME 130 may send a deactivate request to eNB 125 (signal 1225). eNB 125 may respond by sending a Radio Resource Control (RRC) connection reconfiguration to UE 110 (signal 1230).

UE 110 may send an RRC connection reconfiguration complete message to eNB 125 (signal 1235) and eNB may, in response, send a deactivate response to MME 130 (signal 1240). Furthermore, EU 110 may send a direct transfer message to eNB 125 (signal 1245). eNB 125 may, in response, send a deactivate bearer message to MME 130, which may include information about the location of UE 110 (signal 1250).

MME 130 may determine current time zone information associated with UE 110 and may include the current location information and the determined time zone information in a delete bearer response and send the delete bearer response to SGW 135 (signal 1255) and SGW 135 may forward the delete bearer response to PGW 140 (signal 1260). PGW 140 may now respond to the re-authorization request by sending a re-authorization answer (RAA) to PCRF 145 over Gx interface 142 (signal 1265). The re-authorization answer may include the current location and time zone information. PCRF 145 may, in response to receiving the re-authorization answer, send a session termination answer to P-CSCF 165 over Rx interface 144 (signal 1270). The session termination answer may include the location and time zone information.

P-CSCF 165 may send a Diameter protocol accounting request (ACR) to CCF 170 over Rf interface 162 (signal 1275). The ACR message may include information about the IMS session associated with UE 110 and the current location and/or time zone information about UE 110 that may be used to determine charges for the call. CCF 170 may respond with a Diameter protocol accounting answer (ACA) over Rf interface 162 (signal 1280).

Furthermore, PGW 140 may send a Diameter protocol re-authorization request (RAR) to OCF 180 over Gy interface 146 (signal 1285), for example, when UE 110 is a subscriber associated with OCF 180. The re-authorization request may include the location and time zone information received by PGW 140 from MME 130. OCF 180 may respond with a re-authorization answer (RAA) over Gy interface 146 (signal 1290). OCF 180 may use the information from PGW 130 to determine on-line charges for UE 110.

Figure 13:
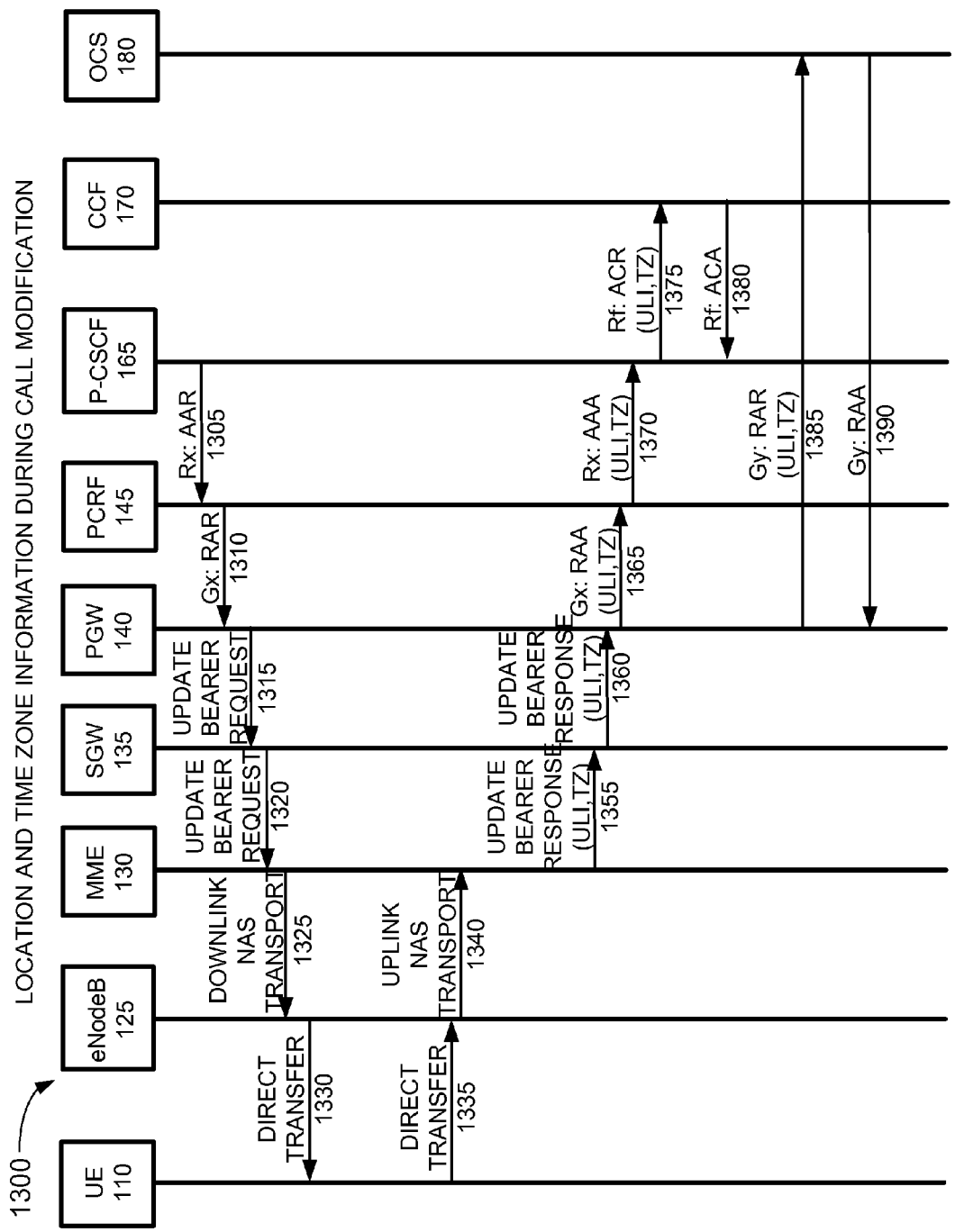
FIG. 13 is a diagram of an example signal flow during a call modification according to an implementation described herein.

FIG. 13 is a diagram of an example signal flow 1300 during a call modification. When a modification occurs with respect to the call, a bearer associated with the call may need to be updated. For example, the call may be changed from active to hold or from a video call to an audio call and may require a change in a bandwidth associated with the bearer. Furthermore, a change in the bearer (e.g., a change in the bandwidth) may result in a change in the charges being applied to the call. As shown in FIG. 13, signal flow 1300 may include P-CSCF 165 sending a Diameter protocol authentication authorization request (AAR) to PCRF 145 over Rx interface 144 (signal 1305). PCRF 145 may respond by sending a Diameter protocol re-authorization request (RAR) to PGW 140 over Gx interface 142 (signal 1310). The re-authorization request may be a request to access network 120 to update a bearer associated with the call associated with UE 110. PGW 140 may wait to receive current location and time zone information from MME 130 before responding to the re-authorization request.

PGW 140 may send an update bearer request to SGW 135 (signal 1315) and SGW 135 may forward the update bearer request to MME 130 (signal 1320). MME 130 may send a downlink non-access stratum (NAS) transport message to eNB 125 (signal 1325) and eNB 125 may respond by sending a direct transport message to UE 110 (signal 1330). UE 110 may respond with a direct transport message to eNB 125 (signal 1335), and eNB 125 may, in response, send an uplink NA transport response with the current ULI of UE 110 to MME 130 (signal 1340).

MME 130 may determine a time zone information associated with UE 110 and may include the current ULI and/or the current time zone information in a update bearer response and send the update bearer response to SGW 135 (signal 1355) and SGW 135 may forward the update bearer response to PGW 140 (signal 1360). PGW 140 may now respond to the re-authorization request by sending a re-authorization answer (RAA) to PCRF 145 over Gx interface 142 (signal 1365). The re-authorization answer may include the current location and time zone information. PCRF 145 may, in response to receiving the re-authorization answer, send an authorization authentication answer to P-CSCF 165 over Rx interface 144 (signal 1370). The authorization authentication answer may include the current location and time zone information.

P-CSCF 165 may send a Diameter protocol accounting request (ACR) to CCF 170 over Rf interface 162 (signal 1375). The ACR message may include information about the current location and/or time zone information associated with UE 110 that may allow CCF 170 to determine updated charges for the call. CCF 170 may respond with a Diameter protocol accounting answer (ACA) over Rf interface 162 (signal 1380).

Furthermore, PGW 140 may send a Diameter protocol re-authorization request (RAR) to OCF 180 over Gy interface 146 (signal 1385), for example, when UE 110 is a subscriber associated with OCF 180. The re-authorization request may include the current location and/or time zone information received by PGW 140 from MME 130. OCF 180 may respond with a re-authorization answer (RAA) over Gy interface 146 (signal 1290). OCF 180 may use the information from PGW 130 to update on-line charges for UE 110.

The foregoing description provides illustration and description, but is not intended to be exhaustive or to limit the implementations to the precise form disclosed. Modifications and variations are possible in light of the above teachings or may be acquired from practice of the embodiments.

While series of blocks have been described with respect to FIGS. 7, 8, 9, and 10, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    obtaining, by a mobility management entity device, time zone information for a user equipment;
    generating, by the mobility management entity device, a bearer message, the bearer message including the time zone information for the user equipment; and
    providing, by the mobility management entity device, the generated bearer message to a packet data network gateway associated with the user equipment.

2. The method of claim 1, where obtaining the time zone information of the user equipment includes:
    obtaining location information associated with the user equipment; and
    determining the time zone information based on the obtained location information.

3. The method of claim 1, where the bearer message includes a create bearer response to a create bearer request.

4. The method of claim 1, where the bearer message includes a delete bearer response to a delete bearer request.

5. The method of claim 1, where the bearer message includes an update bearer response to an update bearer request.

6. A system comprising:
    a mobility management entity device to:
        obtain time zone information for a user equipment;
        generate a bearer message;
        include the time zone information in the generated bearer message; and
        provide the generated bearer message to a packet data network gateway associated with the user equipment.

7. The system of claim 6, where, when the mobility management entity device is to obtain the time zone information of the user equipment, the mobility management entity device is to:
    obtain location information associated with the user equipment; and
    determine the time zone information based on the obtained location information.

8. The system of claim 6, where the bearer message includes a create bearer response to a create bearer request.

9. The system of claim 6, where the bearer message includes a delete bearer response to a delete bearer request.

10. The system of claim 6, where the bearer message includes an update bearer response to an update bearer request.

11. A method comprising:
    receiving, by a packet data network gateway, a first request associated with a bearer associated with a user equipment from a policy charging and rules function device;
    sending, by the packet data network gateway and in response to receiving the first request, a second request associated with the bearer to a mobility management entity device;
    receiving, by the packet data network gateway, time zone information associated with the user equipment from the mobility management entity device; and
    providing, by the packet data network gateway and in response to receiving the location or time zone information, the received time zone information to the policy charging and rules function device.

12. The method of claim 11, further comprising:
providing, by the packet data network gateway, the received time zone information to an online charging system device.

13. The method of claim 12, where the providing the received time zone information to the online charging system device includes:
providing the received time zone information over a Gy interface.

14. The method of claim 12, where the providing the received time zone information to the online charging system device includes:
providing the received time zone information in a Diameter protocol re-authorization request.

15. A system comprising:
a packet data network gateway to:
receive a first request associated with a bearer associated with a user equipment from a policy charging and rules function device;
send, in response to receiving the first request, a second request relating to the bearer to a mobility management entity device;
receive time zone information associated with the user equipment from the mobility management entity device; and
provide, in response to receiving the location or time zone information, the received time zone information to the policy charging and rules function device.

16. The system of claim 15, where the packet data network gateway is further to:
provide the received time zone information to an online charging system device.

17. The system of claim 16, where, when the packet data network gateway is to provide the received time zone information to an online charging system device, the packet data network gateway is to:
provide the received location or time zone information to the online charging system device in a Diameter protocol re-authorization request over a Gy interface.

18. A method comprising:
receiving, by one or more devices, a request from an Internet Protocol Multimedia Subsystem, where the request relates to an Internet Protocol Multimedia Subsystem service associated with a user equipment;
obtaining, by the one or more devices, time zone information for the user equipment;
providing, by the one or more devices, the obtained time zone information to the Internet Protocol Multimedia Subsystem; and
providing, by the one or more devices, the obtained time zone information to an online charging system, wherein the online charging system is configured to determine charges for a pre-paid service based on the Internet Protocol Multimedia Subsystem service and based on the obtained time zone information.

19. The method of claim 18, where the request is associated with at least one of:
creation of a bearer for the user equipment;
deletion of a bearer associated with the user equipment; or
updating of a bearer associated with the user equipment.

20. The method of claim 18, wherein providing the obtained time zone information to the Internet Protocol Multimedia Subsystem includes:
sending a Diameter protocol message to the Internet Protocol Multimedia Subsystem over an Rx interface.

21. The method of claim 18, where providing the obtained time zone information to an online charging system includes:
Sending a Diameter protocol message to the online charging system over a Gy interface.

* * * * *